T. H. SAMPSON.
PROCESS OF TREATING RED GUM AND OTHER LIKE WOODS.
APPLICATION FILED JULY 8, 1912.
1,048,102.
Patented Dec. 24, 1912.
2 SHEETS—SHEET 2.
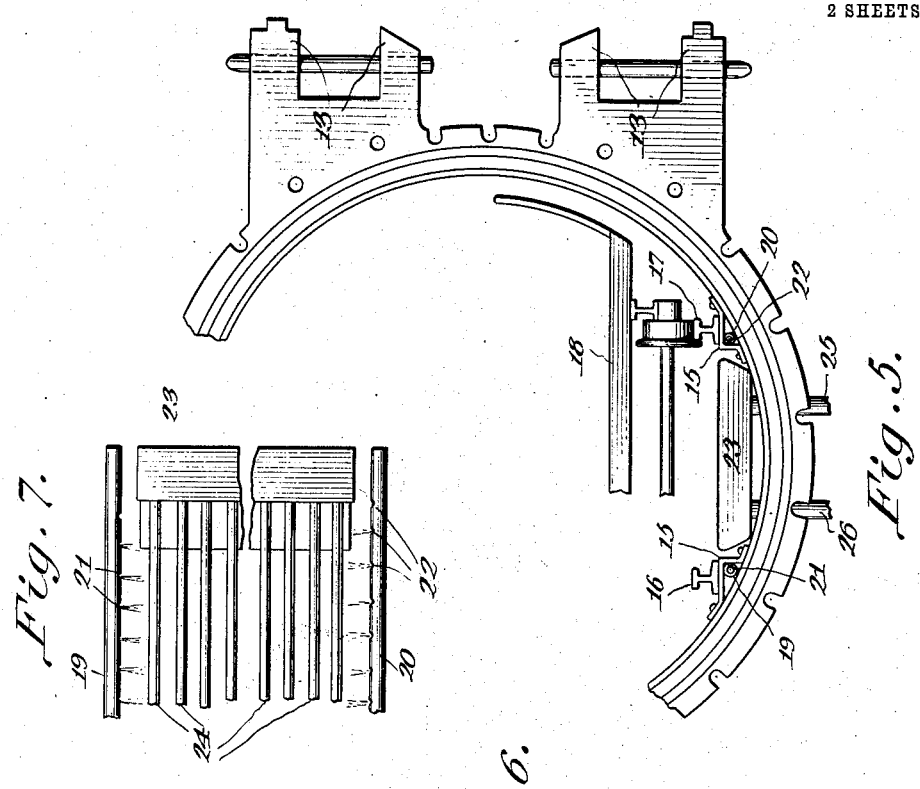
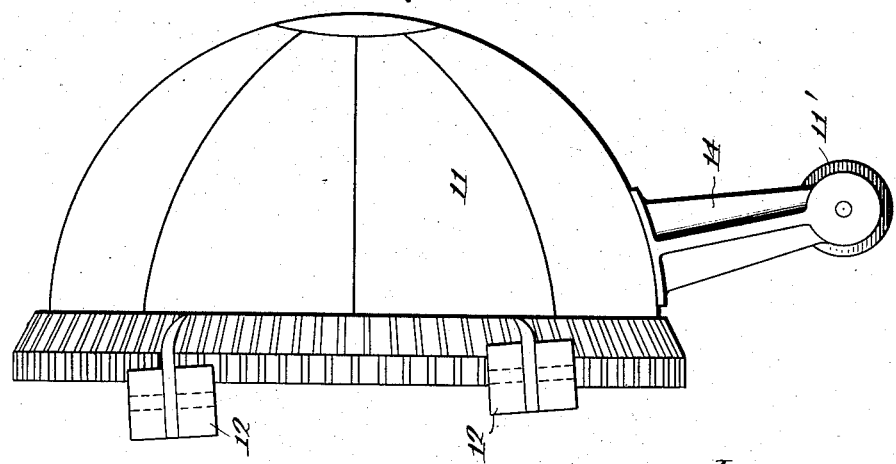
Witnesses:
Inventor:
Thomas Harlow Sampson.

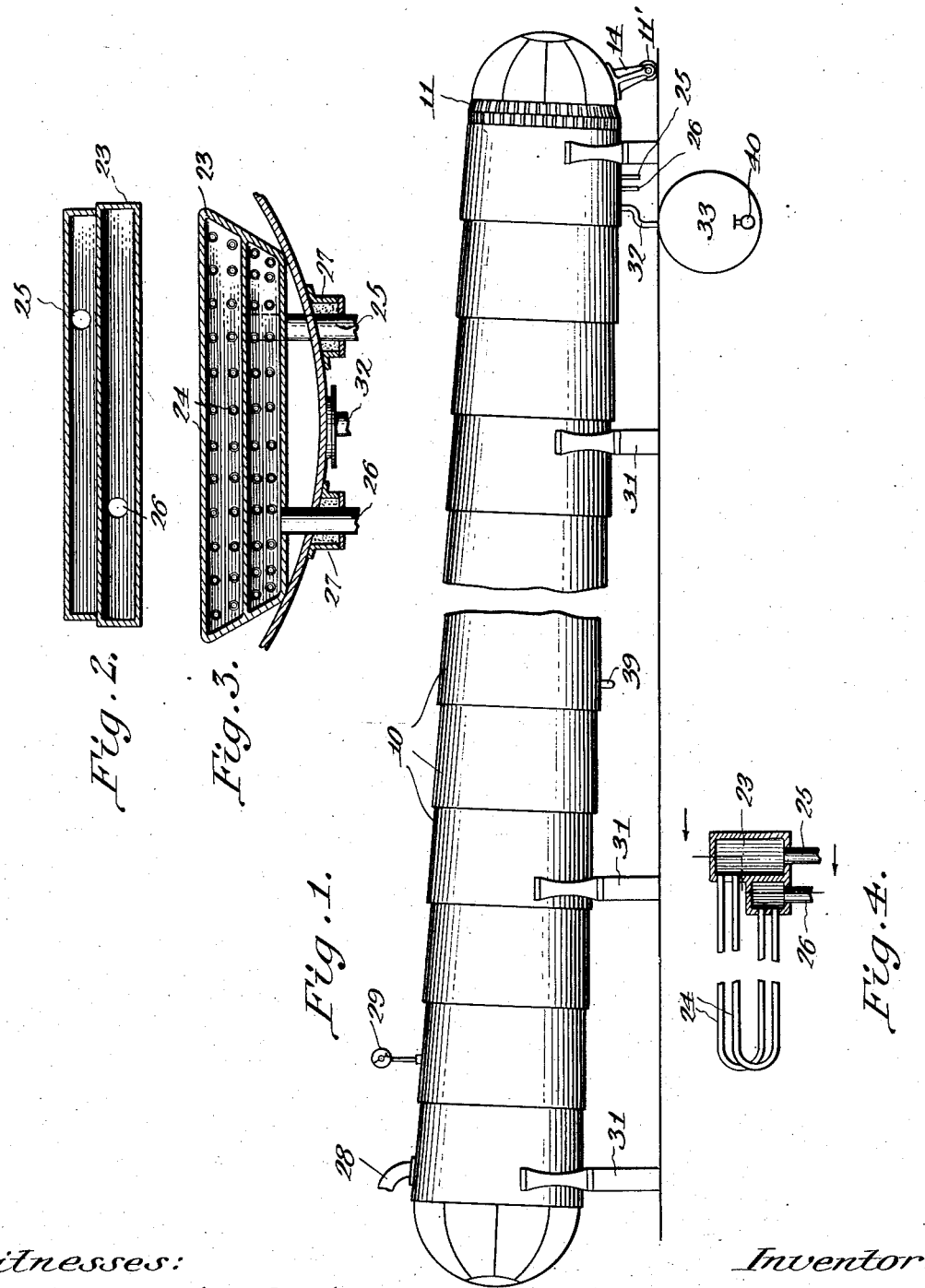

UNITED STATES PATENT OFFICE.

THOMAS HARLOW SAMPSON, OF NEW ORLEANS, LOUISIANA.

PROCESS OF TREATING RED-GUM AND OTHER LIKE WOODS.

1,048,102.     Specification of Letters Patent.     Patented Dec. 24, 1912.

Application filed July 8, 1912. Serial No. 708,387.

*To all whom it may concern:*

Be it known that I, THOMAS HARLOW SAMPSON, a citizen of the United States of America, and a resident of New Orleans, parish of Orleans, and State of Louisiana, have invented a new and useful Process of Treating Red-Gum and other Like Woods, of which the following is a specification.

This invention relates to processes for treating red gum and other like woods, with the primary object of preventing sap stain and stick rot when in pile, warping or twisting when dried, and the giving said wood, treated by said process, a deeper red color.

A still further object of this invention is to provide an apparatus capable of use in carrying out the process in an expeditious and inexpensive manner for attaining the several objects indicated.

With the foregoing and other objects in view, the invention consists in the process and in the steps thereof, and the apparatus for carrying the same into practice, all of which is to be hereinafter more fully set forth and specifically claimed.

In describing the invention in detail, reference will be had to the accompanying drawings, forming a part of this specification, wherein like characters denote corresponding parts in the several views, in which—

Figure 1 illustrates a side elevation of an apparatus suitable for carrying out my process. Fig. 2 illustrates the bottom of a pair of headers for connection to steam pipes for heating the cylinder. Fig. 3 is a section of the header taken on the dotted line in Fig. 4 looking in the direction of the arrow and showing the steam and exhaust connections 25 and 26, passing through the cylinder shell, and the end bottom opening of cylinder 32 for the attachment of pipe connecting up cylinder with sap tank 33. Fig. 4 is a sectional view of the header showing the steam pipes connected thereto. Fig. 5 is an end view of the retort with the door removed, showing the fragment of a truck therein for carrying the material to be treated. Fig. 6 is an enlarged detail view of one end of the retort. Fig. 7 is a view of heating manifold with connecting piping and perforated piping for introduction of live steam to the cylinder.

In carrying out the invention I provide a chamber formed of a series of sections, 10, all of said sections being conical and slightly tapered in order that the small end of one section may fit into the large end of the next succeeding section, riveted or otherwise secured together to form tight joints. The several sections, when assembled produce a cylinder, and the length and diameter of the cylinder is an immaterial detail, and it may be varied to suit particular requirements. Both ends of the cylinder may be removable (in the drawing but one is so shown), but have air and steam tight joints with the cylinder.

I have shown in Fig. 6 an enlarged detail of the door, 11, which, it will be seen, is provided with arms, 12, designed to be hinged to lugs 13 formed on the cylinder, whereas 14 is the support supplied with roller 11'—upon which the door is supported in opening and closing.

Within the cylinder I provide a series of brackets 15 on each side of the longitudinal center of the said cylinder, and I attach the said brackets to the internal sides of the cylinder for the purpose of supporting the two rails 16 and 17, which form a track for the truck 18, designed to contain the material to be treated. The brackets embrace and retain in place two lines of pipe 19 and 20, which, in practice, have connection on each side of cylinder, with a source of steam supply 39, and said pipes 19 and 20 are provided throughout their entire length with orifices 21 and 22 respectively; the orifices in one pipe facing the orifices in the opposite pipe, in order that steam discharged therefrom will be directed horizontally toward the heating pipes of the cylinder.

Within the cylinder, at lower end thereof, I place a manifold steam connection 23, which in operation has direct connection with the boiler or steam supply by pipe 25, and this manifold has connected to it a series of steam pipes 24, which extend practically the full length of the cylinder and return, in order that a circulation of steam may be established throughout the said pipes 24. The manifold and the steam pipes are placed near the bottom of the cylinder in position to receive the jets of steam from the pipes 19 and 20, which pipes will, as stated, carry steam designed to be heated by the coils or pipes 24, previously described. The manifold is provided with a steam supply pipe 25, and an exhaust pipe 26, both of which extend through the bottom of the cylinder and are surrounded by stuffing boxes 27, to produce a steam tight joint. The retort is further provided with a nipple and T 28, designed as a connection for a vacuum pump and safety valve; and a pressure gage, 29.

The cylinder or retort is supported in an inclined position by the yokes 31, in order that the condensed steam and the liquid discharge from the material under treatment may flow down to the lower end of the cylinder or retort and discharge through the pipe 32 to the tank 33.

33 is an end view of a cylindrical sap tank, connected up by pipe 32 to the lowermost bottom end of the cylinder, which said sap tank may be of any shape, that it will be tight under pressure and vacuum to be carried in cylinder; said pipe 32 to have at the most accessible part of its length an independent cut off valve.

40 is the pipe and valve for emptying the sap tank 33.

Suitable valves are provided where necessary, for the purpose of controlling the several pipes, in the use of direct and heating steam; vacuum by vacuum pump and the control of steam and liquids into and from the sap tank.

The apparatus, therefore, as described, comprises a means such as a car for carrying material to be treated into a self draining cylinder or retort, which is provided with a track for the wheels of the car, and with the coils of pipe for supplying the heat and moisture used in carrying out the process and an underneath separate tank for holding drainage from cylinder contents.

In treating the sap and heartwood of the red gum tree and other like woods to cause the same to become a deeper red and at the same time to prevent the liability to warp and twist, I first cut the red gum or other like trees that have been felled into the required lengths for saw logs, and immediately thereafter immerse the logs in water, before they are worked. I submit the logs to the first mentioned step in the process until they are thoroughly water soaked. If the wood is to be treated in the log, the saturated log is loaded on the cars, which cars are run into the cylinder or retort for treatment. If the lumber and not the log is to be treated, the saturated log is first cut into the lumber of the size desired, which lumber is then loaded on the car, which is to carry the said lumber into the cylinder or retort. In arranging the lumber on the car, I prefer that lumber of equal thicknesses and lengths shall be piled in layers, the said layers having interposed cross strips for the purpose of forming spaces for the circulation of air, heat or steam. The object of saturating the wood before it is subjected to treatment in the retort is: First: to cause the gummy, sappy matters lining the cellular tissues of the wood to dissolve in the water and become a dilute solution, which, by the action of the saturated steam, are kept in solution without drying and without coagulation, thus rendering them capable of being exhausted from the wood by the subsequent treatment of steaming before drying, to be presently described. Second: to prevent, while in immersion and held for sawing up of logs into lumber and treatment, the sap wood from discoloration and staining, and to prevent rot and a boring of holes by insects. The method of treating the contents of the cars after it has been delivered to the cylinder or retort, is as follows, viz: The doors of the cylinder or retort are hermetically closed, the valve in pipe 32 opened and steam from a suitable source of supply having a pressure of not over five pounds is gradually admitted into the heating coil through pipe 25, and into the cylinder through the perforated pipes 19 and 20, until, displacing the atmosphere therein and completely filling the cylinder at atmospheric pressure it passes from the lowermost end opening of the cylinder through pipe 32 and valve 40 of the sap tank. The first effect of the steam thus admitted is to drive out of the wood the gummy liquid saps in solution, and to cause the condensed steam of the cylinder to pass off from the outlet pipe 40, charged with black flocculent matter. This step of the treatment is continued until the sap is exhausted from the wood. When flocculent matter ceases to be discharged through pipe 40, this valve is closed and the heat and pressure within the cylinder is increased from a steam pressure of zero to a steam pressure of 20 pounds. By the admission of the steam just indicated the material being treated, whether it be lumber or uncut logs, is thoroughly heated and will show an increased reddish coloring throughout its structure, both in the sap and in the heart wood; the time required for bringing about the results varying from 12 hours for 1″ boards to 36 hours for 24″ logs, according to thickness. After the material has been treated by the steam pressure just indicated, and the material being treated has become reddish in color, the valve 40 in sap tank is opened and the pressure of steam is allowed to escape, after which the valve 40 of the drainage tank 33 is closed and the connections are opened to the vacuum pump. When the pumps have been operated to such an extent as to produce a vacuum of 20″ to 24″ the heating coil in the bottom of the cylinder giving off sufficient heat to maintain the temperature above the boiling point, due to the rarefaction of the air within the retort due to the action of the vacuum pump, the vacuum is maintained until the remaining liquid saps are removed from the tissues of the wood, taking one hour for 1" boards and twelve hours for 24" logs proportionate to thicknesses. The result of the process up to this point will be to drive out all sappy matter softened and dissolved by the soaking to which the material has been subjected, which, if unextracted from the ordinary untreated lumber in the usual lumber yard pile, there acted on by the different atmospheric conditions of dryness and dampness, would have caused the wood to warp badly, stain and rot. After this last mentioned step in the process has been carried out, the doors of the cylinder are opened and the charge of lumber or logs run out; logs, which have been treated, are sent to the saw mill to be cut up as desired into lumber or veneering, which lumber or veneering is then dried in a kiln. Where cut lumber is treated as distinguished from the logs, said lumber is taken from the cylinder or retort and is placed in the drying kilns. Thus the treatment has completely changed their nature and made them valuable for a higher class of workmanship into furniture and the like. A similar result can also be given to the sap or heart wood of the red gum and other like woods by the above treatment, even though they are not watersoaked beforehand, if they are cut down and before the liquid sap in the tree can dry out, immediately subjected to the treatment hereinbefore described before a chemical decomposition of sap or sap stain can take place. The time required in the treatment of the material, under these last mentioned conditions, is much longer, and there are portions of the gummy sap which are not driven out by the action of steaming. On the other hand, some of the gummy sap coagulates and hardens on the walls of the cellular tissues of the wood, and as the wood is not then free of the gummy matters as in the first method of water soaking, it is liable in the final drying in the kiln to hollowhorn, warp and stain, and goods manufactured from such lumber will not be found as satisfactory nor will it retain its shape permanently as well.

Where lumber has been treated and finally dried and manufactured by this process, it has been found that both the sap and the heartwood continue to grow a darker red and in no way lose their reddish effects natural to the red gum wood and other like woods.

I claim—

1. A process for treating the wood of the red gum tree and other like woods, consisting in subjecting the wood to the action of water until said wood is saturated, and in steaming the saturated wood at atmospheric pressure in a retort until the condensed steam charged with black flocculent matter ceases to discharge from the retort, and then increasing the steam pressure within the retort to twenty pounds, until the wood is thoroughly heated to the temperature due to that steam pressure, so as to drive out the saps therein, thereby preventing sap stain and stick rot when in pile and the after warping and twisting when dried, as well as causing the same to become deeper red in color, all as substantially described.

2. A process for treating the wood of the red gum tree and other like woods, consisting in subjecting the wood to the action of saturated steam at atmospheric pressure in a retort until the condensed steam charged with black flocculent matter ceases to discharge from the retort, and then increasing the steam pressure within the retort to twenty pounds, until the wood is thoroughly heated to the temperature due to that pressure, so as to drive out the saps therein, thereby preventing sap stain and stick rot when in pile and the after warping and twisting when dried, as well as causing the same to become deeper red in color, all as substantially described.

THOMAS HARLOW SAMPSON.

Witnesses:
 ROSA KLAR,
 JOSEPH C. HELMER.